US008618926B1

(12) United States Patent
Thompson

(10) Patent No.: US 8,618,926 B1
(45) Date of Patent: Dec. 31, 2013

(54) WARNING SYSTEM TO AVOID CHILD HYPERTHERMIA IN VEHICLES

(76) Inventor: Pelar Thompson, Inglewood, CA (US)

( * ) Notice: Subject to any disclaimer, the term of this patent is extended or adjusted under 35 U.S.C. 154(b) by 293 days.

(21) Appl. No.: 13/065,455

(22) Filed: Mar. 23, 2011

(51) Int. Cl.
    G08B 19/00 (2006.01)
(52) U.S. Cl.
    USPC .......................................... 340/522
(58) Field of Classification Search
    USPC ............... 340/522, 457, 426.19, 573.1, 506, 340/539.13; 701/45, 1
    See application file for complete search history.

(56) References Cited

U.S. PATENT DOCUMENTS

| 7,170,401 | B1 * | 1/2007 | Cole | 340/457 |
| 7,348,880 | B2 * | 3/2008 | Hules et al. | 340/522 |
| 7,714,737 | B1 * | 5/2010 | Morningstar | 340/667 |
| 8,038,213 | B2 * | 10/2011 | Owens | 297/250.1 |
| 2002/0161501 | A1 * | 10/2002 | Dulin et al. | 701/45 |
| 2003/0222775 | A1 * | 12/2003 | Rackham et al. | 340/457 |
| 2004/0095252 | A1 * | 5/2004 | Kraljic et al. | 340/687 |
| 2004/0155783 | A1 * | 8/2004 | Al-Sheikh | 340/584 |

* cited by examiner

Primary Examiner — Phung Nguyen

(57) ABSTRACT

A safety system for passenger space in an enclosed vehicle includes a thermostat having a threshold temperature and an ambient temperature sensor in the passenger space to generate a signal representing the threshold temperature in the passenger space. An occupant sensor in the passenger space generates a signal representing the presence of an occupant of the passenger space. The system further includes a GPS locator, a radio transmitter and a controller. The controller receives the signal representing the threshold temperature in the passenger space and the signal representing presence of an occupant of the passenger space. It is in communication with the GPS locator and includes a timer measuring time from the ambient temperature signal exceeding the temperature threshold value, a timer threshold value and a signal output generator. A first output signal to the radio transmitter is generated which in turn is transmitted as an alert to a key fob. A second output signal to the GPS locator is generated to contact a first responder network responsive to the second output signal. The system further includes an arming signal to the controller and a reset signal to the controller.

2 Claims, 1 Drawing Sheet

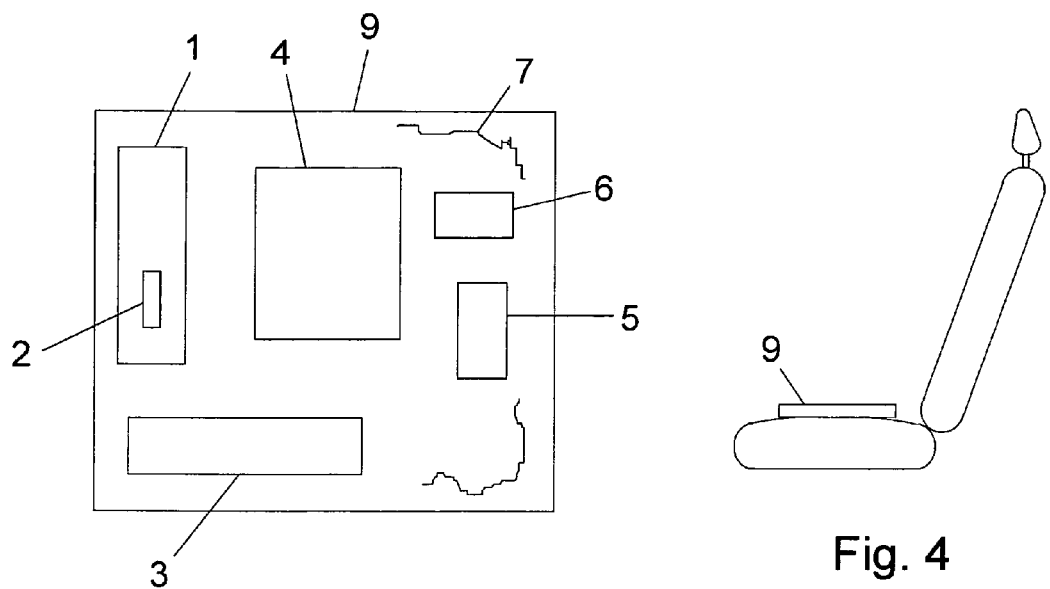
Fig. 1
Fig. 4
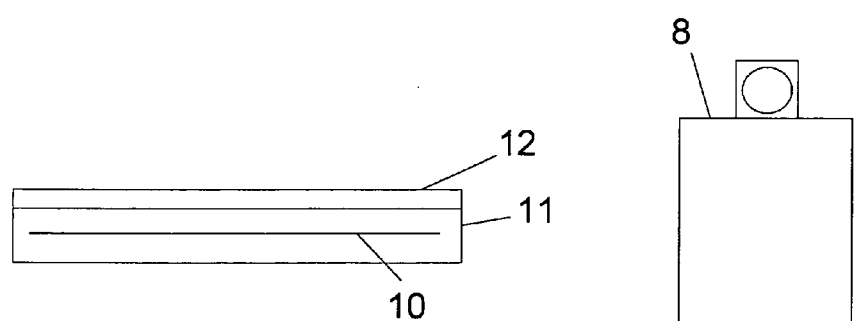
Fig. 2
Fig. 3

WARNING SYSTEM TO AVOID CHILD HYPERTHERMIA IN VEHICLES

BACKGROUND OF THE INVENTION

The field of the present invention is child safety equipment.

A story on the news exemplifies repeated tragedies regarding children left in automobiles. According to the report, a man who left his young daughter in a hot mini-van. The man was not the primary caregiver for his daughter but on this particular day was called to care for her. He picked her up from day care and continued on his normal daily activities. After running his errands he went to work. On this day the local temperature was over 100 degrees Fahrenheit. After about an hour or so, he remembered that the child was with him and that she was still in the car. Temperatures inside the car had reached over 140 degrees Fahrenheit. The child was dead.

For over the past ten years nationwide hyperthermia related deaths caused directly from children being overheated in unattended cars have been on a constant increase. In 1992 there was a law passed that required parents to put children in rear seats. The law is understood to have aided in saving children from dangers associated with being in the front seat. However, the effects of the child sitting behind the adult or driver in the rear seat may have resulted in the increase of hyperthermia related deaths in cars. Unfortunately, out of sight is out of mind in some cases, and heat related deaths have increased to 42 deaths per year nationwide.

SUMMARY OF THE INVENTION

The present invention is directed to a safety system for passenger space in an enclosed vehicle to prevent hyperthermia. An ambient temperature sensor and an occupant sensor are located in the passenger space of the vehicle. A controller receives signals representing ambient temperature and occupant presence in the passenger space. The geographic location of the vehicle is also received from a position locator.

The controller can employ the received signals to generate multiple signals to a transmitter. At least a timed signal to the transmitter is employed to contact a first responder network with the sensed emergency and the vehicle location. A first signal upon sensing of the emergency may be used to alert immediate help.

The invention may further be incorporated into a child's car seat with the occupant sensor being a load sensor in the car seat.

Thus, it is a principal object of the present invention to provide remote alarms when a danger of hyperthermia for occupants of a passenger vehicle exists. Other and further objects and advantages will appear hereinafter.

BRIEF DESCRIPTION OF THE DRAWINGS

FIG. 1 is a schematic of a safety system for preventing hyperthermia.

FIG. 2 is a side view of the safety system of FIG. 1.

FIG. 3 is a schematic of a key fob receiver.

FIG. 4 is a side view of a vehicle interior seat.

DETAILED DESCRIPTION OF THE PREFERRED EMBODIMENTS

In the drawings, a safety system for the passenger space of an enclosed vehicle is illustrated which is to prevent occupant hyperthermia.

An ambient temperature thermostat 1 having a heat sensor 2 detects the temperature within the passenger space of the vehicle. The device is preferably shielded from the sun so as to correctly measure ambient temperature without a direct sun load. The sensor my also record outside temperature at a remote location. The thermostat 1 includes at least one threshold temperature to be compared with the ambient temperature measured inside the vehicle. A signal representing the ambient temperature measured inside the vehicle is generated when the interior of the vehicle reaches this threshold.

A power source 3 may be hard wired into the vehicle electrical system if the safety system is not intended to be portable. If the safety system is portable, the power source 3 may employ a rechargeable battery in the unit. This source 3 conveniently drives all elements of the system.

A controller 4 regulates the functions of the system through associate relays. It may provide timer functions for the system. The controller 4 is coupled to the thermostat 1 to receive signals there from. The signal representing the ambient temperature measured inside the vehicle is transmitted to the controller 4 when the interior of the vehicle reaches the threshold temperature.

A radio transmitter 5 is also coupled with the controller 4. The transmitter 5 transmits to a cellular or pager system.

A GPS system 6 maintains the location of the safety system. It includes a transceiver as a backup to component 5. The system 6 has a timed memory chip to signal first responder emergency personnel for rescue purposes. It also is coupled to the controller 4 and may include its own timer function. This GPS system 6 may employ such systems as OnStar, an interactive emergency service of OnStar LLC of Detroit Mich. using telecommunications services with electronic transmission of voice messages and data, and it attendant functionalities.

A coil supporting pad 7 provides a structure for support and comfort as a seating pad for the total assembly 9 shown in FIG. 4 on a passenger seat of a vehicle. Occupant sensor coils 10 are mounted on the coil supporting pad 7. The sensor coils 10 register the presence of an occupant in the seat who is to be protected against hyperthermia. The sensor coils 10 are also coupled with the controller 4. The coils 10 function as an on/off switch. When weight is applied, the switch is on, when removed, the switch is off. A seating pad 11 is located above the sensor coils 10 with a further durable cover material 12 forming the actual seat surface. Ultimately, the sensor coils 10 are to be waterproof, either by their construction or that of either the pad 11 or cover material 12 which should also be heat resistant and provide a fire retardant.

A key fob receiver 8 is capable of being retained with the ignition control car key of the vehicle or attached to a caregiver's clothing. The fob 8 is a warning device/beeper to remind the individual in control of the vehicle that the temperature in the vehicle has reached the threshold. The key fob receiver is paired with the radio transmitter 5. The transmitter 5 transmits to a cellular or pager system in turn transmitting to the key fob 8.

An activation condition is employed to arm the safety system. This can be the vehicle being turned off or another weight sensing coil at the driver's seat to indicate that the driver has left the vehicle or both. A weight sensing coil 10 as used in the passenger seat my be employed for the driver as well.

In operation, the system is installed in an enclosed passenger compartment of a vehicle where the occupant to be protected against hyperthermia will be positioned. The controller 4 is coupled with the several components including the thermostat 1, the power source 3, the transmitter 5, the GPS system 6, the occupant sensor coils 10 and the arming sensor such a power shutoff.

Once armed, the safety system monitors signals from the thermostat 1 and the occupant sensor coils 10. When the threshold temperature signal is received and the occupant sensor coils 10 have activated the system through the presence of an occupant, a signal is directed from the controller 4 to the transmitter 5 which communicates with the key fob 8. Thus, a signal is sent to the driver or caregiver to alert them of the occupant within the warmed vehicle compartment. A timer function is initiated with the transmission of the signal to the key fob 8 for a predetermined period of time. Seven minutes is suggested.

If the alerted party returns, the system may be disarmed by removing the occupant from the sensor coils 10. The system may additionally employ a reset button or the act of unlocking the vehicle door, either or both being coupled with the controller 4. The reset button may also be associated with the key fob but would only reset the time for another alert. If time expires without the system being disarmed or reset, a back-up relay switch notifies police and/or fire departments, for rescue purposes. It contains GPS capability. This may be provided by an interactive emergency service using telecommunications services with electronic transmission of voice messages and data, such as OnStar.

Thus, a safety system is disclosed to provide remote alarms when a danger of hyperthermia for occupants of a passenger vehicle exists. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A safety system for passenger space in an enclosed vehicle, comprising
    a thermostat having a threshold temperature, an ambient temperature sensor in the passenger space and a signal representing the threshold temperature in the passenger space from the temperature sensor;
    an occupant sensor in the passenger space having a signal representing the presence of an occupant of the passenger space;
    a GPS locator;
    a radio transmitter;
    a controller receiving the signal representing the threshold temperature in the passenger space, receiving the signal representing presence of an occupant of the passenger space and being in communication with the GPS locator and including a timer measuring time from the ambient temperature signal exceeding the temperature threshold value, a timer threshold value and a signal output generator, the controller generating a first output signal to the radio transmitter representing the ambient temperature above the temperature threshold and the presence of an occupant in the passenger space, the controller generating a second output signal to the GPS locator representing the ambient temperature above the temperature threshold, the presence of an occupant in the passenger space and the time exceeding the timer threshold value, the radio transmitter sending a first alarm responsive to the first output signal, the GPS locator contacting a first responder network responsive to the second output signal; a key fob, the first alarm being transmitted to the key fob to generate a signal emanating from the key fob.

2. The safety system of claim 1 further comprising
an arming signal to the controller;
a reset signal to the controller.

* * * * *